(12) United States Patent
Utagawa (10) Patent No.: US 9,276,985 B2
(45) Date of Patent: Mar. 1, 2016

(54) TRANSMISSION APPARATUS AND TRANSMISSION METHOD

(75) Inventor: Yuka Utagawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 12/967,953

(22) Filed: Dec. 14, 2010

(65) Prior Publication Data

US 2011/0141936 A1    Jun. 16, 2011

(30) Foreign Application Priority Data

Dec. 15, 2009 (JP) ................................. 2009-284571

(51) Int. Cl.
  *H04L 12/26* (2006.01)
  *H04L 29/06* (2006.01)

(52) U.S. Cl.
  CPC .................................. *H04L 65/608* (2013.01)

(58) Field of Classification Search
  CPC .................................................... H04L 65/608
  See application file for complete search history.

(56) References Cited

U.S. PATENT DOCUMENTS

| | | | | |
|---|---|---|---|---|
| 6,643,496 B1 * | 11/2003 | Shimoyama et al. | ........... | 455/69 |
| 7,190,670 B2 * | 3/2007 | Varsa et al. | ................... | 370/229 |
| 7,274,761 B2 * | 9/2007 | Muller et al. | ................. | 375/354 |
| 7,327,676 B2 * | 2/2008 | Teruhi et al. | ................... | 370/230 |
| 7,342,880 B2 * | 3/2008 | Yanagihara et al. | .......... | 370/232 |
| 7,463,578 B2 * | 12/2008 | Iwamura et al. | ............. | 370/216 |
| 7,583,666 B2 * | 9/2009 | Kohno | ........................... | 370/389 |
| 8,265,022 B2 * | 9/2012 | Hans | .............................. | 370/329 |
| 8,347,189 B2 * | 1/2013 | Ihara | .............................. | 714/776 |
| 2002/0004841 A1 * | 1/2002 | Sawatari | ....................... | 709/232 |
| 2002/0191594 A1 * | 12/2002 | Itoh et al. | ..................... | 370/352 |
| 2003/0037158 A1 * | 2/2003 | Yano et al. | .................... | 709/232 |
| 2003/0072269 A1 * | 4/2003 | Teruhi et al. | .................. | 370/252 |
| 2003/0120794 A1 * | 6/2003 | Futenma et al. | ............. | 709/231 |
| 2003/0231589 A1 * | 12/2003 | Itoh et al. | ...................... | 370/230 |
| 2004/0066775 A1 * | 4/2004 | Grovenburg | .................. | 370/350 |
| 2004/0190511 A1 * | 9/2004 | Miyaji et al. | .................. | 370/389 |
| 2004/0215805 A1 * | 10/2004 | Tan et al. | ...................... | 709/231 |
| 2004/0215810 A1 * | 10/2004 | Tan et al. | ...................... | 709/232 |
| 2004/0246907 A1 * | 12/2004 | Hoffmann | ...................... | 370/252 |
| 2005/0005020 A1 * | 1/2005 | Rey et al. | ...................... | 709/231 |
| 2005/0182850 A1 * | 8/2005 | Kohno | .......................... | 709/236 |
| 2006/0018266 A1 * | 1/2006 | Seo | ................................ | 370/252 |
| 2006/0070111 A1 * | 3/2006 | Kurosawa | ...................... | 725/105 |
| 2006/0198395 A1 * | 9/2006 | Lappalainen et al. | ........ | 370/503 |
| 2007/0030821 A1 * | 2/2007 | Iwamura et al. | ............. | 370/328 |
| 2007/0177625 A1 * | 8/2007 | Morinaga et al. | ............ | 370/468 |
| 2008/0095247 A1 * | 4/2008 | Ohno et al. | .............. | 375/240.28 |
| 2008/0168178 A1 * | 7/2008 | Bouazizi | ........................ | 709/231 |
| 2008/0189587 A1 * | 8/2008 | Takaku | ........................... | 714/748 |
| 2009/0046639 A1 * | 2/2009 | Cai et al. | ....................... | 370/329 |

(Continued)

FOREIGN PATENT DOCUMENTS

| | | |
|---|---|---|
| JP | 62-186636 A | 8/1987 |
| JP | 2005-328131 A | 11/2005 |

(Continued)

*Primary Examiner* — Steven H Nguyen
(74) *Attorney, Agent, or Firm* — Canon USA, Inc. IP Division (57) ABSTRACT

A determination unit of a transmission apparatus determines a transmission timing of notice data (SR) for informing a reception apparatus that the event data has been transmitted according to a transmission state of the event data. An transmission unit transmits the SR at the timing determined by the determination unit.

14 Claims, 8 Drawing Sheets

(56) References Cited

U.S. PATENT DOCUMENTS

| | | | |
|---|---|---|---|
| 2009/0193135 A1* | 7/2009 | Prasad et al. | 709/231 |
| 2010/0020682 A1* | 1/2010 | Yamada | 370/229 |
| 2010/0020713 A1* | 1/2010 | Frankkila | 370/252 |
| 2010/0049865 A1* | 2/2010 | Hannuksela et al. | 709/231 |
| 2010/0202368 A1* | 8/2010 | Hans | 370/329 |
| 2011/0013514 A1* | 1/2011 | Mahkonen | 370/235 |

FOREIGN PATENT DOCUMENTS

| | | | | |
|---|---|---|---|---|
| JP | 2005-341441 A | 12/2005 | | |
| WO | WO 2005053227 A1 * | 6/2005 | | H04L 12/24 |
| WO | WO 2008032283 A2 * | 3/2008 | | H04L 29/06 |

* cited by examiner

TRANSMISSION APPARATUS AND TRANSMISSION METHOD

BACKGROUND OF THE INVENTION

1. Field of the Invention

The present invention relates to a transmission method of notice data indicating that event data to be transmitted corresponding to an occurrence of the event has been transmitted.

2. Description of the Related Art

As a packet loss determination method of a periodic packet (e.g., video data packet) that is periodically transmitted, a method is known for checking a sequence number applied to the packet. A reception apparatus can detect a packet loss by finding a loss of the sequence number.

On the other hand, Japanese Patent Application Laid-Open No. 2005-328131 discusses a method for determining a packet loss of an event packet transmitted corresponding to an occurrence of an event. In Japanese Patent Application Laid-Open No. 2005-328131, a transmission apparatus applies different marker bits to a leading packet and an ending packet of a packet group corresponding to subtitles that are irregularly transmitted.

The reception apparatus determines that the ending packet is lost when the ending packet is not received within a predetermined time since the leading packet has been received. However, with respect to some event data, it takes time to detect the loss of the event data.

An example of an aforementioned case includes a case where the number of packets of the event data to be transmitted is changed corresponding to the occurring event. Particularly, when the event having the small number of packets of the event data to be transmitted occurs, a predicted time since the leading packet has been received until the ending packet is received is longer than an actual time. Accordingly, when the predicted time has elapsed, a longer than actual time for detecting the loss of the ending packet has elapsed.

Further, when one packet of the event data is transmitted according to the occurrence of the event, the different marker bits cannot be applied to the leading packet and the ending packet. Thus, until the packet of the next event data is received, the packet loss of the event data may not be detected.

SUMMARY OF THE INVENTION

The present invention is directed to rapidly detecting of a loss of event data transmitted according to an occurrence of an event.

According to an aspect of the present invention, a transmission apparatus transmits event data to a reception apparatus corresponding to an occurrence of an event. The transmission apparatus includes a determination unit, and a transmission unit. The determination unit determines a transmission timing of notice data for informing the reception apparatus that the event data has been transmitted according to a transmission state of the event data. Moreover, the transmission unit transmits the notice data at the transmission timing determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Configurations described below in the exemplary embodiments are merely examples thereof, and the present invention is not limited thereto.

Figure 1:
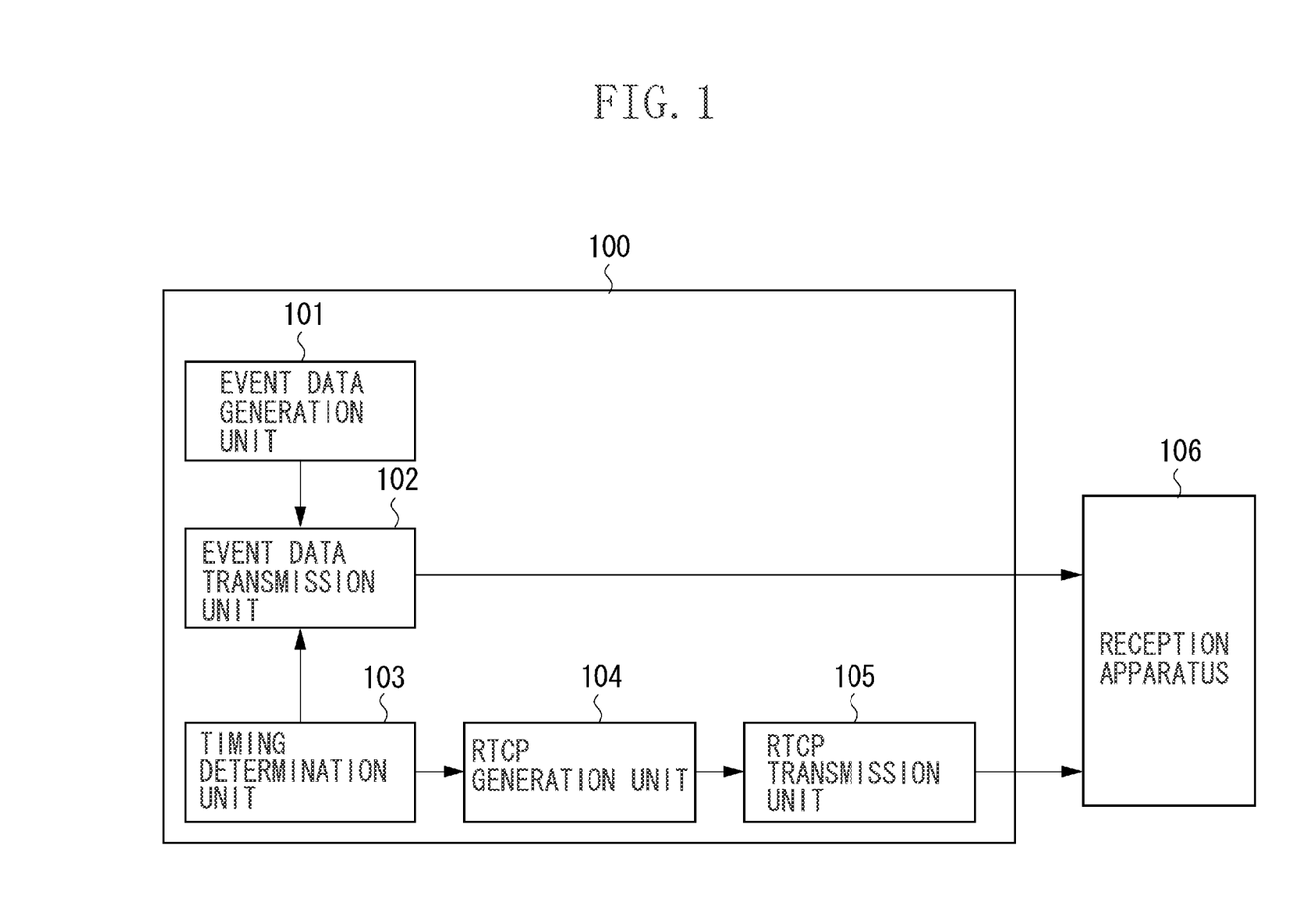
FIG. 1 is a block diagram illustrating a configuration example of a transmission apparatus and a reception apparatus according to a first exemplary embodiment.

FIG. 1 is a block diagram illustrating a functional configuration example of a transmission apparatus 100 and a reception apparatus 106 of the present exemplary embodiment. Each apparatus, including the transmission apparatus 100 and the reception apparatus 106, may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs.

The transmission apparatus 100 includes an event data generation unit 101, an event data transmission unit 102, a timing determination unit 103, a real time transport control protocol (RTCP) generation unit 104, and an RTCP transmission unit 105. The transmission apparatus 100 of the present exemplary embodiment transmits video data to the reception apparatus 106 via a transport protocol for real-time application (RTP). Further, the RTCP refers to the RTP control protocol. The transmission apparatus 100 of the present exemplary embodiment transmits a sender report (SR) of the RTCP to the reception apparatus 106 in order to inform transmission of the event data, and another protocol can also be used.

An event data generation unit 101 generates the event data corresponding to an occurrence of the event. The events to be detected include, for example, people detection, object movement detection, trouble detection with an external sensor, and a change of a camera control right via a user terminal. Further, the event data to be generated includes, for example, information indicating a type of the detected event and information about event details. The information about the event details includes, for example, when people are detected, a time when the people are detected, the number of people, and positions of the people in a screen. The event data transmission unit 102 transmits the event data generated by the event data generation unit 101 to the reception apparatus 106. More specifically, the event data transmission unit 102 transmits the event data to the reception apparatus 106 corresponding to the occurrence of the event. The timing determination unit 103 determines transmission timing of notice data (SR) for informing the reception apparatus 106 that the event data has been transmitted, according to a transmission state of the event data by the event data transmission unit 102.

Figure 8:
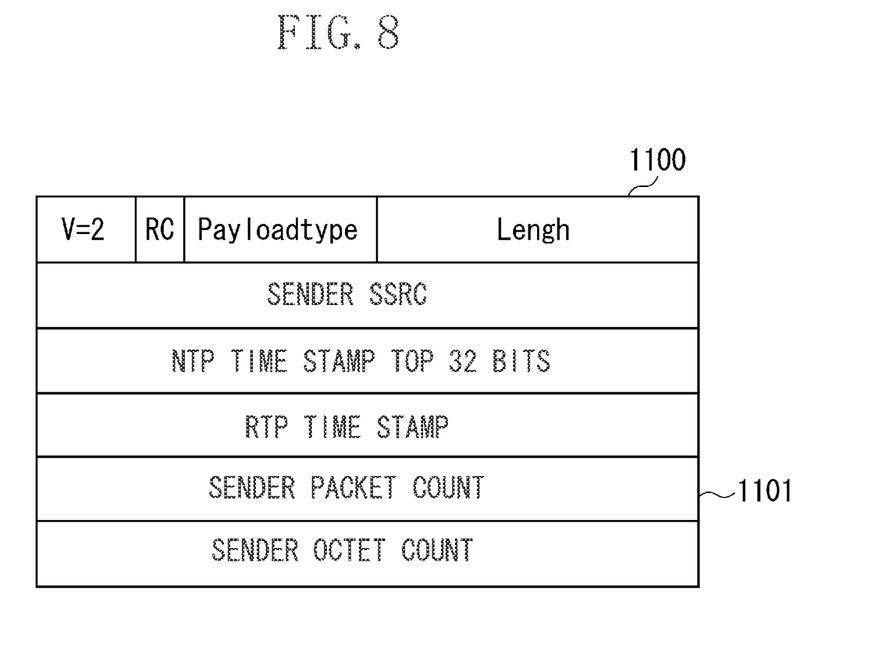
FIG. 8 illustrates an example of a packet configuration of RTCP.

The RTCP generation unit 104 generates the SR (notice data) of the RTCP. The RTCP transmission unit 105 transmits to the reception apparatus 106 the SR generated by the RTCP generation unit 104 at the timing determined by the timing determination unit 103. In the present exemplary embodiment, the event data transmission unit 102 and the RTCP transmission unit 105 are described as separate transmission units, however it is also possible to share one transmission unit. FIG. 8 illustrates a part of a figure of the RTCP packet (SR1100).

The reception apparatus 106 can detect a packet loss based on a transmitter packet count 1101 recorded by the SR. The transmitter packet count 1101 records a total number of packets transmitted after the transmission apparatus 100 has established a session with the reception apparatus 106. For example, if 90 is recorded for an SR sender's packet count, it describes that the transmission apparatus 100 has transmitted ninety packets to the reception apparatus 106.

Further, if 10 is recorded for the next SR sender packet count, it describes that the transmission apparatus 100 has transmitted ten packets after having sent the previous SR. At this point, if the reception apparatus 106 actually receives nine packets, it can be detected that one packet is lost. For example, when a sequence number of the last event packet that has been received is 99, the reception apparatus 106 detects that the event packet of the sequence number 100 is lost.

Furthermore, for example, when the event packets of the sequence numbers 98, 99, and 100 are lost, based on a total number of transmission packets and the number of received packets, the reception apparatus 106 can detect the loss of the event packet. More specifically, based on the number of packets of the event packets that has been received so far and the number of transmission packets included in the SR, the reception apparatus 106 can specify the event packet that could not be received. The reception apparatus 106 of the present exemplary embodiment, for example, when the event packet of the sequence number 97 is lost, and the event packet 98 is normally received, it can be detected that the event packet 97 is lost.

Figure 2:
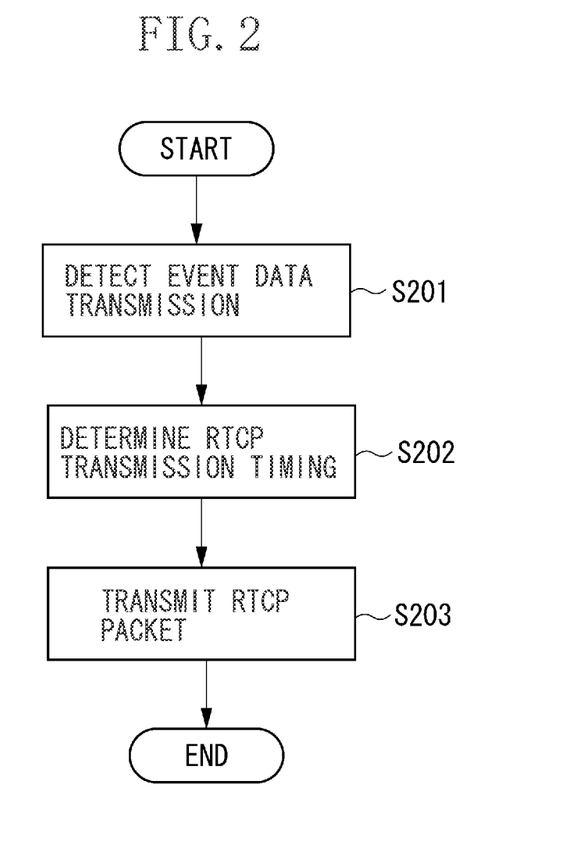
FIG. 2 is a flowchart illustrating processing performed by a transmission apparatus according to the first exemplary embodiment.

FIG. 2 is a flowchart illustrating processing performed by the transmission apparatus 100 of the present exemplary embodiment.

In step S201, the timing determination unit 103 detects transmission of the event data performed by the event data transmission unit 102.

In step S202 (determination procedure), the timing determination unit 103 determines the transmission timing of the notice data (SR) for informing the reception apparatus 106 that the event data has been transmitted corresponding to the transmission timing of the event data. A method for determining the transmission timing of the SR by the timing determination unit 103 will be described below.

In step S203 (transmission procedure), the RTCP transmission unit 105 transmits the SR generated by the RTCP generation unit 104 at the transmission timing determined by the timing determination unit 103.

Figure 3:
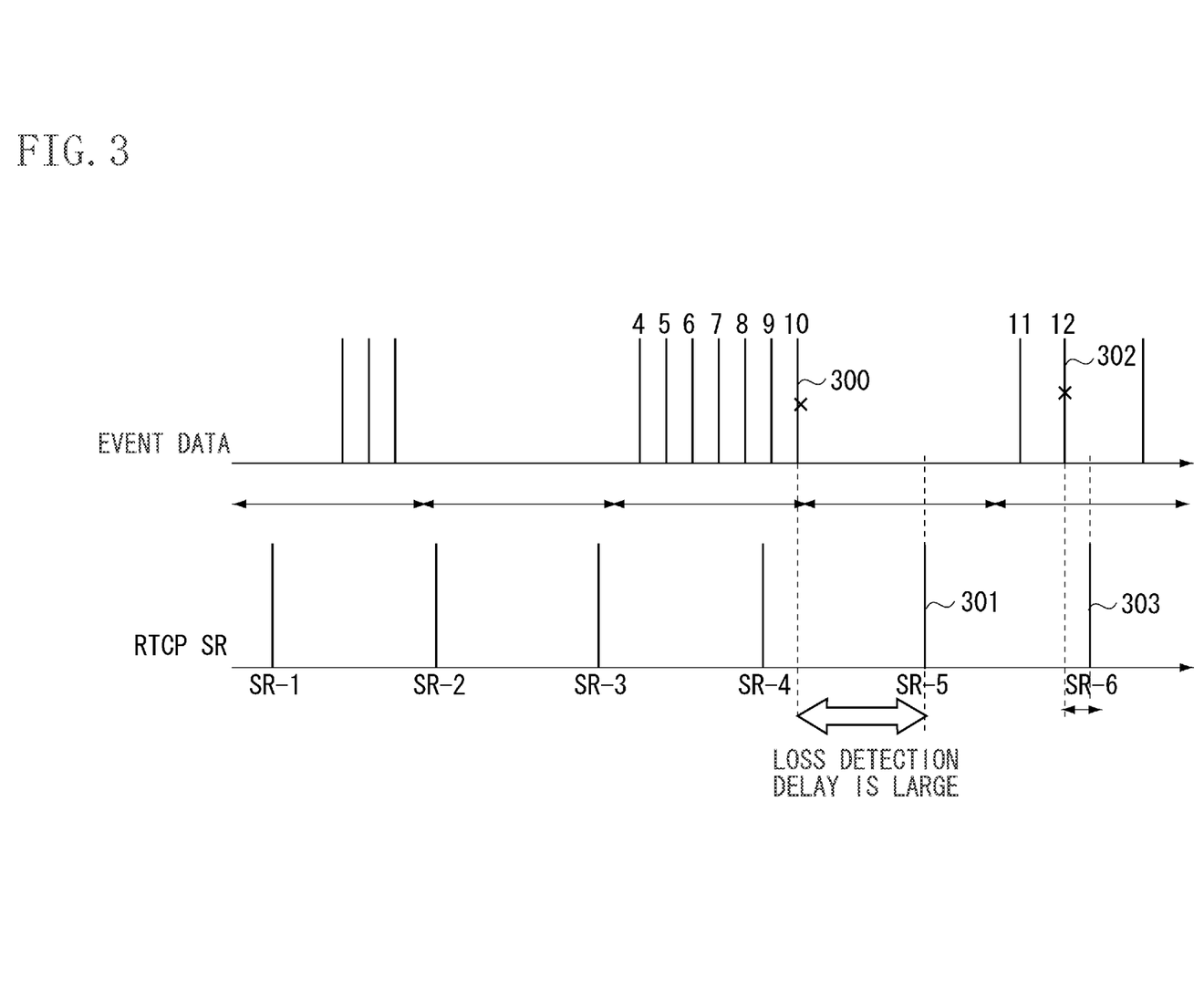
FIG. 3 illustrates an example of transmission timings of past SRs.

FIG. 3 illustrates an example of the transmission timings of the event data and the SRs when the SRs are transmitted at a regular interval. In FIG. 3, the event data 10 and 12 are lost. The reception apparatus 106 detects the loss of the event data 10 and 12 corresponding to the receptions of SR-5 and the SR-6 respectively.

The reception apparatus 106 detects that the event data 10 has not been received (lost) corresponding to the reception of the SR-5. Further, the reception apparatus 106 detects the loss of the event data 12 corresponding to the reception of the SR-6. As illustrated in FIG. 3, if it takes much time from the timing at which the lost event data 10 should be otherwise received until the SR-5 is received, detection of the loss of the event data can be delayed.

Figure 4:
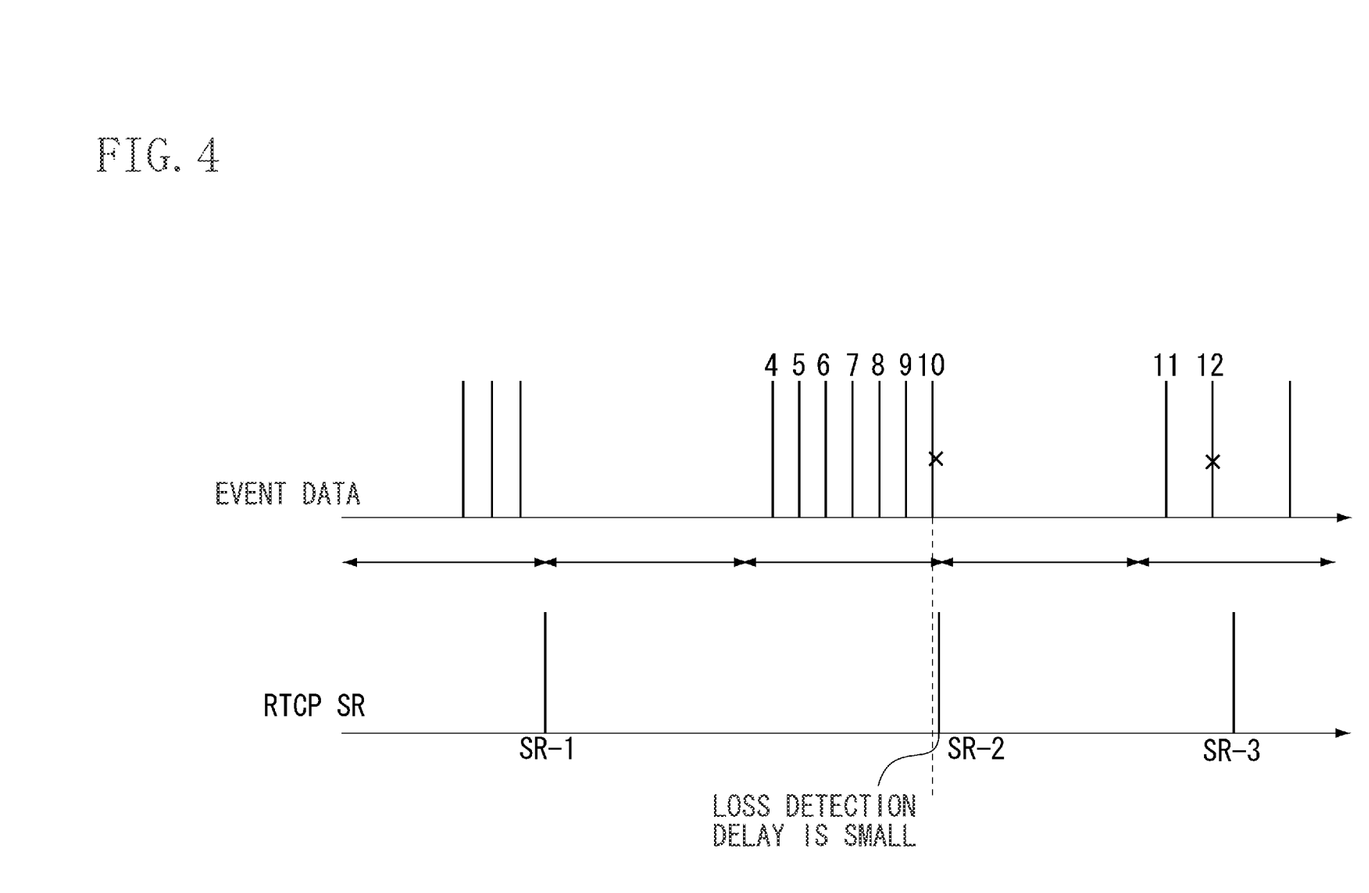
FIG. 4 illustrates an example of transmission timings of SRs according to the first exemplary embodiment.

FIG. 4 illustrates an example of the SRs and the transmission timing of the event data of the present exemplary embodiment. As with FIG. 3, in FIG. 4, the event data 10 and 12 are also lost. In this example, the reception apparatus 106 detects the loss of the event data 10 corresponding to the reception of SR-2. Further, the reception apparatus 106 detects the loss of the event data 12 corresponding to the reception of the SR-3. As described above, the timing determination unit 103 of the present exemplary embodiment determines the transmission timing of the SR according to the transmission state of the event data to rapidly detect the loss of the event data.

Further, the reception apparatus 106 of the present exemplary embodiment, in a period while the event data is not being transmitted, the SR for indicating that the event data has been transmitted is not transmitted to the reception apparatus 106. With this arrangement, a load incurred when the SR is generated and a load of a network can be decreased.

Next, a method for determining the transmission timing of the SR by the timing determination unit 103 of the present exemplary embodiment will be described. The timing determination unit 103 holds a time (last transmission time) when the event data transmission unit 102 has transmitted the event data last. Further, after the RTCP transmission unit 105 has transmitted the SR last, the timing determination unit 103 holds a transmission time (transmission start time) of the first transmitted event data and a current time, among the event data transmitted by the event data transmission unit 102. The timing determination unit 103 determines the transmission timing of the SR using the final transmission time, the transmission start time, and the current time.

More specifically, the timing determination unit 103 determines the transmission timing of the SR (first method) so that the SR is transmitted when a difference between the current time and the final transmission time reaches a predetermined time. More specifically, the timing determination unit 103 determines the transmission timing of the SR so that, after the event data has been transmitted, the SR is transmitted corresponding to elapse of a first predetermined time without transmitting the next event data. The SR is a notice data for informing the reception apparatus 106 that the event data has been transmitted.

Further, the timing determination unit 103 determines the transmission timing of the SR (second method) so that the SR is transmitted when a difference between the transmission start time and the current time reaches a predetermined time. More specifically, the timing determination unit 103 determines the transmission timing of the SR so that the SR is transmitted corresponding to the elapse of a second predetermined time since the event data has begun to be transmitted after the SR has been transmitted.

The timing determination unit 103 of the present exemplary embodiment transmits the SR at the transmission timing determined by the first method described above and also transmits the SR at the transmission timing determined by the second method. By this method, possibility can be increased that the loss of the event data can be detected at an earlier timing than a case where the SR is transmitted by either one of the methods.

As a reason for the above, as an example, a case will be described where the first predetermined time is 100 msec and the second predetermined time is 200 msec. At this point, for example, if only one event packet is transmitted corresponding to the occurring event and then lost, the loss can be detected earlier when the transmission is made at the timing determined by the first method than when the transmission is made by the second method.

On the other hand, when the number of the event packets transmitted corresponding to the occurrence of the event is, for example, thirty, and the SR is transmitted at the timing determined by the first method, the SR is transmitted 100 msec after the thirtieth event packet has been transmitted. Meanwhile, when the SR is transmitted at the timing determined by the second method, the SR is transmitted 200 msec after the first event packet has been transmitted. At this point, if all thirty event packets are lost and the timing determined by the second method is earlier than that by the first method, the loss of the event packet can be detected earlier.

The timing determination unit 103 can determine the transmission timing of the SR using only either one of the first and the second methods. Further, the first and second predetermined times are not limited to the times described above.

Figure 5:
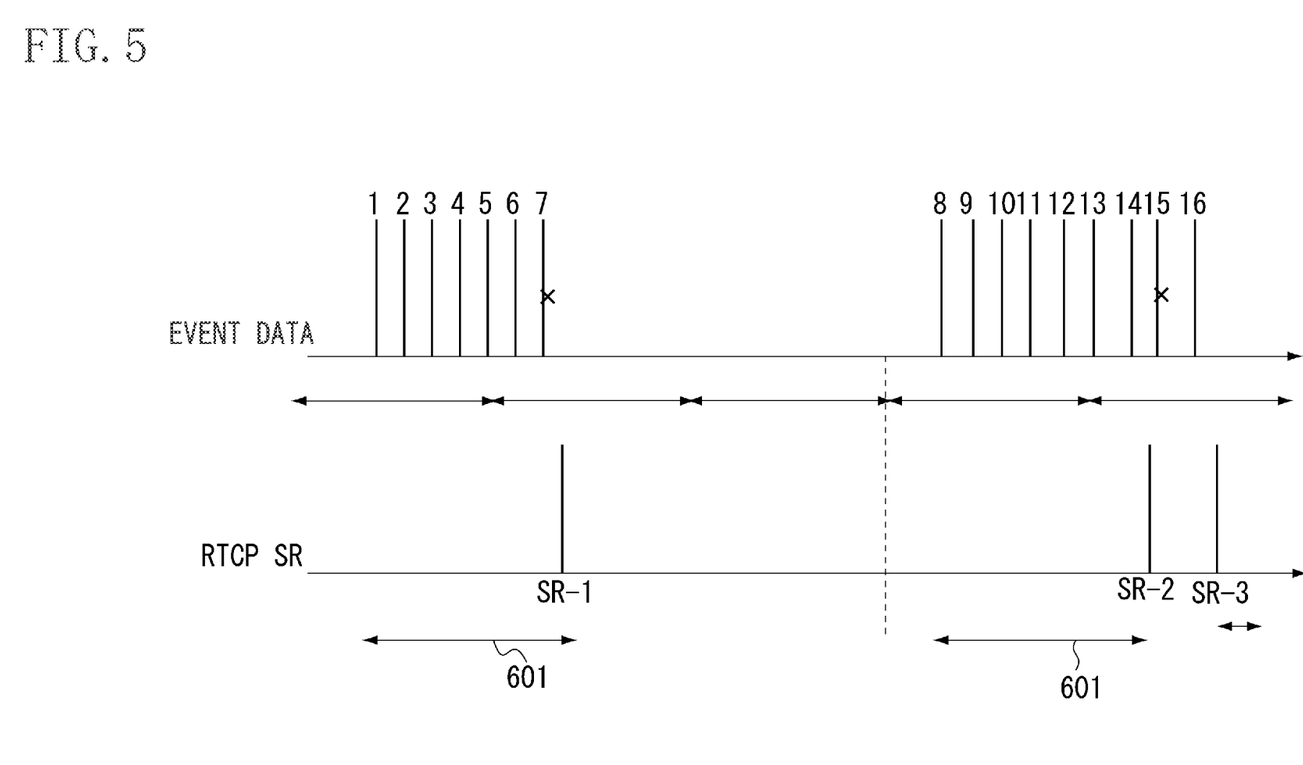
FIG. 5 illustrates another example of transmission timings of SRs according to the first exemplary embodiment.

FIG. 5 illustrates an example where the SR is transmitted at the timing determined by the first and second methods by the timing determination unit 103 of the present exemplary embodiment. As illustrated in FIG. 5, the timing determination unit 103 determines the transmission timing of the SR so that the SR is transmitted corresponding to the elapse of the first predetermined time since the event data 7 has been transmitted. Further, the timing determination unit 103 determines the transmission timing of the SR so that each SR is transmitted corresponding to the elapse of the second predetermined time since the event data 8 has been transmitted and the elapse of the first predetermined time since the event data 16 has been transmitted.

As illustrated in FIG. 5, at the timing when the second predetermined time has elapsed since the event data 1 has been transmitted, the SR is not transmitted. This is because, due to transmission of SR-1, the transmission start time is reset. As described above, the transmission start time refers to a transmission time of the event data that has been first transmitted, among the event data transmitted after the SR has been finally transmitted. In the present exemplary embodiment, examples are described in which the transmission timing of the SR is determined based on a comparison of the current time with the final transmission time and a comparison of the current time and the transmission start time. Further, for example, the transmission timing of the SR can be determined based on a data amount of the event data.

More specifically, the timing determination unit 103 performs data amount determination processing for determining whether the data amount of the event data transmitted after the SR has been transmitted reaches a predetermined data amount. The timing determination unit 103 determines the transmission timing of the SR so that the SR is transmitted when the data amount of the event data reaches the predetermined data amount. With this arrangement, the transmission timing of the SR can be determined without using the time information such as the current time.

Further, as another method for determining the transmission timing of the SR, when the data amount of the event data transmitted corresponding to the occurring event is known, the transmission timing of the SR can be determined by using the data amount. More specifically, the timing determination unit 103 acquires the data amount of the event data transmitted corresponding to the event from the event data generation unit 101. The timing determination unit 103 determines the transmission timing of the SR so that the SR is transmitted corresponding to completion of the transmission of the event data of the acquired data amount. Also with this arrangement, the transmission timing of the SR can be determined without using the time information.

Further, when the second event data corresponding to the occurrence of another event is transmitted while the first event data corresponding to the occurrence of an event is being transmitted, the timing determination unit 103 of the present exemplary embodiment informs that the first and second event data has been transmitted with one SR. More specifically, when the second event data transmission is started before the SR corresponding to the first event data is transmitted and the transmission of the second event data is completed later than that of the first event data, the SR is transmitted after the transmission of the second event data is completed.

The first event data informs that the first event has occurred. The second event data informs that the second event has occurred.

With this arrangement described above, the processing incurred by the generation of the SR and the load of the network can be decreased than the processing when the SR corresponding to the first event data and that corresponding to the second data is separately transmitted. Further, the reception apparatus 106 can detect the loss of the first event data based on the sequence number of the second event data.

In the present exemplary embodiment, examples are described in which the transmission timing of the SR corresponding to the transmission timing of the event data of any event that has occurred. However, considering a priority of the event that has occurred, the transmission timing of the SR can be also determined.

For example, the timing determination unit 103 determines that the event for detecting an intruder has a high priority and that the event for changing a camera control right has a low priority. The timing determination unit 103 sets the first predetermined time of the first method described above shorter when the event (second event) for detecting the intruder occurs than when the event (first event) of the change of the camera control right occurs.

In this case, in step S201, the timing determination unit 103 performs priority determination processing for determining a priority of the event that has occurred.

In step S202, the timing determination unit 103 transmits the SR corresponding to the elapse of the first time, without transmitting the next event data since the first event data for informing that the event of changing the camera control right determined to have the first priority has been transmitted. Further, in step S202, the timing determination unit 103 transmits the SR corresponding to the elapse of the second time, without transmitting the next event data since the second event data for informing that the event of detecting the intruder determined to have the second priority has been transmitted. The second priority is higher than the first priority, and the second time is shorter than the first time.

The priority of each event is not limited to examples described above but can be freely set. Further, a method for determining the transmission timing for the SR according to the priority of the event can be applied to the aforementioned second method. In this case, in step S202, the timing determination unit 103 transmits the SR after the first time has elapsed since transmission of the first event data for informing that the event of changing the camera control right determined to have the first priority has occurred is started. Further, in step S202, the timing determination unit 103 transmits the SR after the second time has elapsed since transmission of the second event data for informing that the event of detecting the intruder determined to have the second priority has occurred is started. The second priority is higher than the first priority, and the second time is shorter than the first time. With this arrangement, the reception apparatus 106 can detect more rapidly the loss of the event data about the event having the higher priority.

Next, a second exemplary embodiment will be described focusing on differences from the first exemplary embodiment. The timing determination unit 103 of the present exemplary embodiment determines the transmission timing of the SR based on whether the event that has occurred is related to medium data. The medium data refers to, for example, video data and audio data.

In the present exemplary embodiment, a case where the transmission apparatus 100 transmits the video data will be mainly described. Further, in the present exemplary embodiment, an event (detecting the intruder or a movement of an object) necessary for displaying an event image (e.g., frame) within a frame of the video data reproduced by the reception apparatus 106 is defined as an event for the medium data. However, the event is not limited to the example described above.

Figure 6:
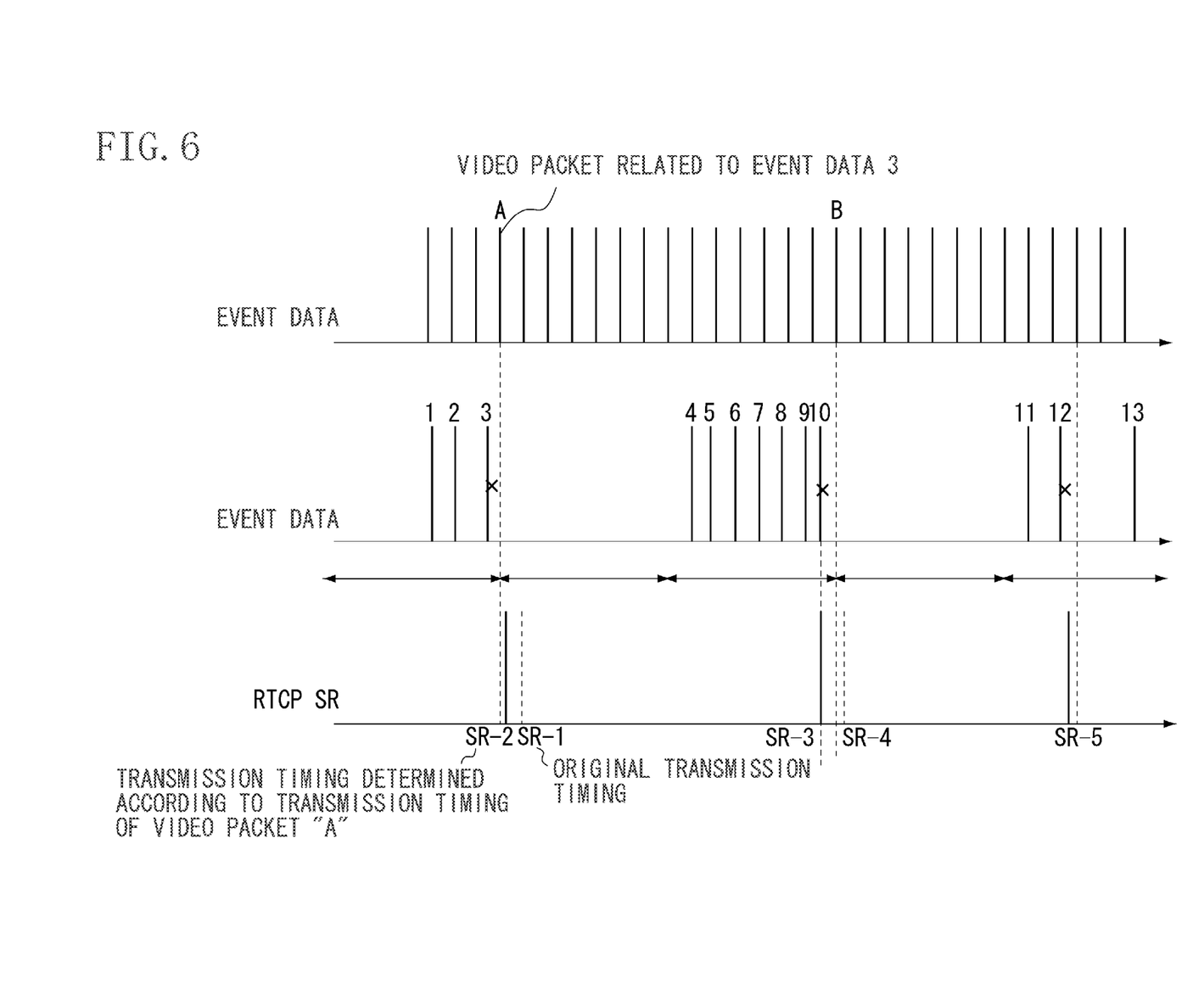
FIG. 6 illustrates an example of transmission timings of SRs according to a second exemplary embodiment.

FIG. 6 illustrates the event data and the transmission timings of the video data and the RTCP packets (SRs) related thereto.

The SR-1 illustrates the transmission timing of the event data by the first method of the first exemplary embodiment. The first method determines the transmission timing of the SR so that the SR can be transmitted when the difference between the current time and the final transmission time reaches the predetermined time. If the event corresponding to the event data 1-3 is determined to be the event whose image is not to be displayed, the timing determination unit 103 of the present exemplary embodiment determines to transmit the SR at a timing of the SR-1.

On the other hand, the SR-2 indicates the transmission timing of the SR when the event corresponding to the event data 1-3 is determined to be the event whose image is to be displayed on the reception apparatus 106. As illustrated in FIG. 6, the timing of the SR-2 comes earlier than that of the SR-1. Accordingly, the reception apparatus 106 can more rapidly detect the loss of the event data related to the video data.

Figure 7:
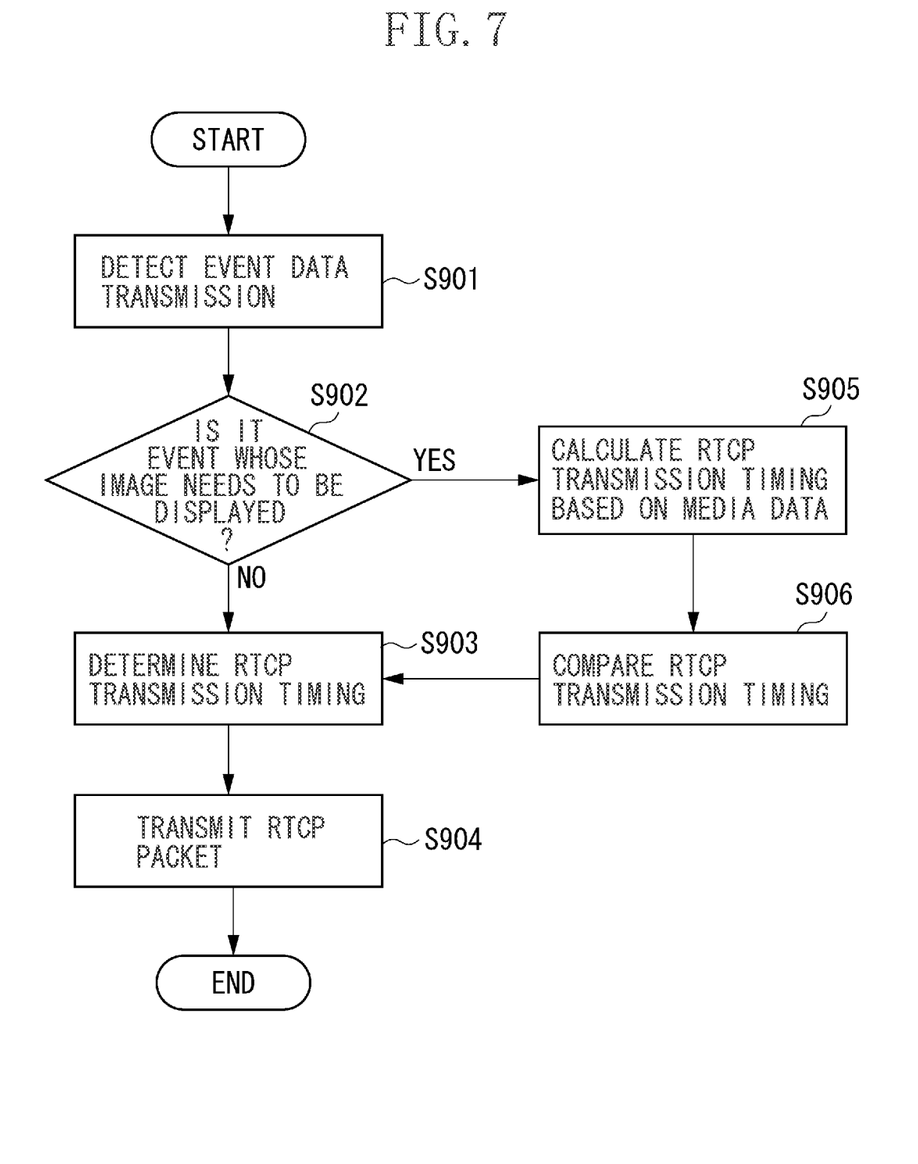
FIG. 7 is a flowchart illustrating processing performed by a transmission apparatus according to the second exemplary embodiment.

FIG. 7 is a flowchart illustrating processing performed by the transmission apparatus 100 of the present exemplary embodiment. The transmission apparatus 100 of the present exemplary embodiment transmits the video data to the reception apparatus 106 and also transmits the event data corresponding to the occurrence of the event. In step S901, the timing determination unit 103 detects the transmission of the event data by the event data transmission unit 102.

In step S902, the timing determination unit 103 performs the relation determination processing for determining whether the event that has occurred is the event whose image is to be displayed within the frame of the video data reproduced by the reception apparatus 106. Further, when the event that has occurred is determined to be the event whose image is to be displayed, the timing determination unit 103 determines the frame for displaying the event image. The event image includes, for example, the frame indicating a position of the intruder and characters indicating that the intruder is detected.

In step S902, when the event that has occurred is determined not to be the event whose image is to be displayed (NO in step S902), the processing proceeds to step S903. When the event that has occurred is determined to be the event whose image is to be displayed (YES in step S903), the processing proceeds to step S905.

In step S905, the timing determination unit 103 determines the transmission timing so that the SR is transmitted at the timing when the transmission of the event data is started and also the transmission of the video data of the frame (first frame) for displaying the event image is completed. The SR transmitted at the transmission timing determined in step S905 is the notice data indicating the event data that has been transmitted, among the event data corresponding to the event.

In step S906, the timing determination unit 103 specifies the earliest transmission timing among the transmission timing determined in step S905 and the transmission timing determined by the first and second methods described in the first exemplary embodiment.

In step S903, the timing determination unit 103 determines the transmission timing of the SR. More specifically, when the event that has occurred is determined to be the event whose image is to be displayed, the timing determination unit 103 determines the transmission timing specified in step S906 as the transmission timing of the SR. On the other hand, when the event that has occurred is determined to be the event whose image is not to be displayed, the timing determination unit 103 determines the transmission timing determined by the first and second methods as the transmission timing of the SR.

In step S904, the timing determination unit 103 transmits the SR at the transmission timing determined in step S903.

As described above, when the event that has occurred is the event whose image is to be displayed within the first frame of the video data reproduced by the reception apparatus 106, the timing determination unit 103 according to the present exemplary embodiment determines the transmission timing of the SR as described below. More specifically, the timing determination unit 103 transmits the SR when the transmission of the event data is started and also the transmission of the video data of the first frame is completed.

In the present exemplary embodiment, the media data to be transmitted is the video data. However, for example, the present exemplary embodiment can be also applied to a case where the audio data is transmitted. For example, when the event that has occurred indicates that audio having a threshold value or more is detected, the timing determination unit 103 determines that the event whose image is to be displayed has occurred. The timing determination unit 103 transmits the SR when the transmission of the event data is started and also the transmission of the first frame corresponding to the timing when the audio having the threshold value or more is detected is completed.

With this arrangement, even when the event data whose image is to be displayed is all lost, a possibility can be increased that the reception apparatus 106 detects the loss of the event until the frame which displays an event image is reproduced. Accordingly, within the frame which displays the event image, it can be displayed that a certain event regarding the video data (audio data) has occurred.

The transmission apparatus 100 of the present exemplary embodiment is an example in which the SR is transmitted at the transmission timing specified in step S906, however the SR may be transmitted at the transmission timing determined by the first and second methods or at the timing determined in step S905 respectively. Further, the transmission apparatus 100 of the present exemplary embodiment can transmit a plurality of medium data pieces to the reception apparatus 106.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes at least one of a transmission apparatus and a reception apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-284571 filed Dec. 15, 2009, which is hereby incorporated by reference herein in its entirety.

What is claimed is:

1. A transmission apparatus comprising:
a processor coupled to a memory;
a transmission unit configured to transmit one or more event packets to a reception apparatus corresponding to a detected event and to transmit notify data for informing the reception apparatus that the one or more event packets have been transmitted;
a determination unit configured to determine whether a time period from a last transmission time at which the transmission unit has transmitted an event packet last reaches a predetermined time period; and
a control unit configured to control the transmission unit, wherein, in a case where the determination unit determines that the time period from the last transmission time reaches the predetermined time period, the control unit is configured to control the transmission unit to transmit notice data for informing the reception apparatus that the last transmitted event packet has been transmitted according to a timing of the determination by the determination unit,
wherein, in a case where the determination unit determines that the time period from the last transmission time does not reach the predetermined time period, the control unit is configured to control the transmission unit not to transmit notice data for informing the reception apparatus that the last transmitted event packet has been transmitted, and
wherein all of the transmission unit, the determination unit, and the control unit are implemented by the processor.

2. The transmission apparatus according to claim 1, wherein, when the predetermined time period passes after the transmission of the last transmitted event packet without transmitting another event packet, the control unit controls the transmission unit to transmit the notice data for informing the reception apparatus that the last transmitted event packet transmitted after another notice data has been transmitted.

3. The transmission apparatus according to claim 1, wherein if, before first notice data for informing that the one or more first event packets corresponding to a first event have been transmitted is transmitted, a transmission of one or more next event packets corresponding to a next event is started and also the transmission of the next event packets is completed later than the transmission of the first event packets is completed, after the next event packets have been transmitted, the control unit controls the transmission unit to transmit the notice data to inform that the first and next event packets have been transmitted.

4. A transmission apparatus to transmit event data to a reception apparatus corresponding to an occurrence of an event, the transmission apparatus comprising:
a data amount determination unit configured to determine whether a data amount of second event data transmitted after first notice data for informing the reception apparatus that first event data has been transmitted has been transmitted, has reached a predetermined data amount;
a timing determination unit configured to determine a transmission timing of second notice data for informing the reception apparatus that the second event data has been transmitted so that the second notice data can be transmitted to inform that the second event data has been transmitted, corresponding to a determination that the data amount of the second event data has reached the predetermined data amount by the data amount determination unit; and
a transmission unit configured to transmit the second notice data at the transmission timing determined by the timing determination unit.

5. The transmission apparatus according to claim 4, further comprising an acquisition unit configured to acquire a data amount of the second event data transmitted corresponding to a second event, wherein the timing determination unit determines the transmission timing of the second notice data so that the second notice data is transmitted to inform that the second event data has been transmitted corresponding to completion of the transmission of the second event data of the data amount acquired by the acquisition unit.

6. A transmission apparatus to transmit event data to a reception apparatus corresponding to an occurrence of an event, the transmission apparatus comprising:
a priority determination unit configured to determine a priority of an event that has occurred;
a determination unit configured to transmit first notice data for informing that first event data has been transmitted after a first time has elapsed since a transmission of the first event data has started to inform that the first event having a first priority determined by the priority determination unit has occurred; and
a transmission unit configured to transmit the notice data at the transmission timing determined by the determination unit, wherein, after a second time shorter than the first time has elapsed since a transmission of the second event data has started for informing an occurrence of the second event having a second priority higher than the first priority determined by the priority determination unit, the determination unit determines the transmission timing of the notice data so that second notice data for informing that the second event data has been transmitted is transmitted.

7. The transmission apparatus according to claim 6,
wherein the priority determination unit transmits, corresponding to an elapse of the first time without transmitting next event data since transmission of first event data for informing that the first event has occurred, the first notice data for informing that the first event data has been transmitted, and
wherein the priority determination unit determines, corresponding to an elapse of a second time shorter than the first time without transmitting a next event since transmission of the second event data for informing that the second event has occurred, the transmission timing of the notice data so that second notice data is transmitted to inform that the second event data has been transmitted.

8. A transmission apparatus to transmit event data to a reception apparatus corresponding to an occurrence of an event, the transmission apparatus comprising:
a relationship determination unit configured to determine whether an event that has occurred is an event of which an event image is to be displayed within a frame of video data reproduced by the reception apparatus and to determine the frame in which the event image is to be displayed;
a transmission unit configured to transmit video data to the reception unit; and
a determination unit configured to determine, when the event that has occurred is determined by the relationship determination unit to be the event of which the event image is to be displayed within a first frame of the video data, the transmission timing of the notice data so that the notice data is transmitted to inform that the event data has been transmitted, among the event data corresponding to the event, when the transmission of the event data corresponding to the event is started and also the transmission of the video data of the first frame is completed, wherein the transmission unit transmits the notice data at the transmission timing determined by the determination unit.

9. A transmission method for a transmission apparatus, the transmission method comprising:
transmitting, via a transmission unit, one or more event packets to a reception apparatus corresponding to a detected event and to transmit notify data for informing the reception apparatus that the one or more event packets have been transmitted;
determining, using a processor coupled to a memory, whether a time period from a last transmission time at which the transmission unit has transmitted an event packet last reaches a predetermined time period; and
controlling the transmission unit to,
wherein, in a case where it is determined that the time period from the last transmission time reaches the predetermined time period, controlling the transmission unit includes controlling the transmission unit to transmit notice data for informing the reception apparatus that the last transmitted event packet has been transmitted according to a timing of the determination by the determining, and
wherein, in a case where it is determined that the time period from the last transmission time does not reach the predetermined time period, controlling the transmission unit includes controlling the transmission unit not to transmit notice data for informing the reception apparatus that the last transmitted event packet has been transmitted.

10. The transmission method according to claim 9, wherein, when the predetermined time period passes after the transmission of the last transmitted event packet without transmitting another event packet, controlling the transmission unit includes controlling the transmission unit to transmit the notice data for informing the reception apparatus that the last transmitted event packet transmitted after another notice data has been transmitted.

11. The transmission method according to claim 9, wherein if, before first notice data for informing that the one or more first event packets corresponding to a first event have been transmitted is transmitted, a transmission of one or more next event packets corresponding to a next event is started and also the transmission of the next event packets is completed later than the transmission of the first event packets is completed, after the next event packets have been transmitted, controlling the transmission unit includes controlling the transmission unit to transmit the notice data to inform that the first and next event packets have been transmitted.

12. A non-transitory storage medium storing a program to cause a transmission apparatus to perform a transmission method, the transmission method comprising:
transmitting, via a transmission unit, one or more event packets to a reception apparatus corresponding to a detected event and to transmit notify data for informing the reception apparatus that the one or more event packets have been transmitted;
determining, using a processor coupled to a memory, whether a time period from a last transmission time at which the transmission unit has transmitted an event packet last reaches a predetermined time period; and
controlling the transmission unit,
wherein, in a case where it is determined that the time period from the last transmission time reaches the predetermined time period, controlling the transmission unit includes controlling the transmission unit to transmit notice data for informing the reception apparatus that the last transmitted event packet has been transmitted according to a timing of the determination by the determining, and
wherein, in a case where it is determined that the time period from the last transmission time does not reach the predetermined time period, controlling the transmission unit includes controlling the transmission unit not to transmit notice data for informing the reception apparatus that the last transmitted event packet has been transmitted.

13. The non-transitory storage medium according to claim 12, wherein, when the predetermined time period passes after the transmission of the last transmitted event packet without transmitting another event packet, controlling the transmission unit includes controlling the transmission unit to transmit the notice data for informing the reception apparatus that the last transmitted event packet transmitted after another notice data has been transmitted.

14. The non-transitory storage medium according to claim 12, wherein if, before first notice data for informing that the one or more first event packets corresponding to a first event have been transmitted is transmitted, a transmission of one or more next event packets corresponding to a next event is started and also the transmission of the next event packets is completed later than the transmission of the first event packets is completed, after the next event packets have been transmitted, controlling the transmission unit includes controlling the transmission unit to transmit the notice data to inform that the first and next event packets have been transmitted.

* * * * *